R. E. BRUCKNER.
SAFETY APPARATUS FOR GAS TANKS.
APPLICATION FILED FEB. 15, 1917.
1,234,726.
Patented July 31, 1917.
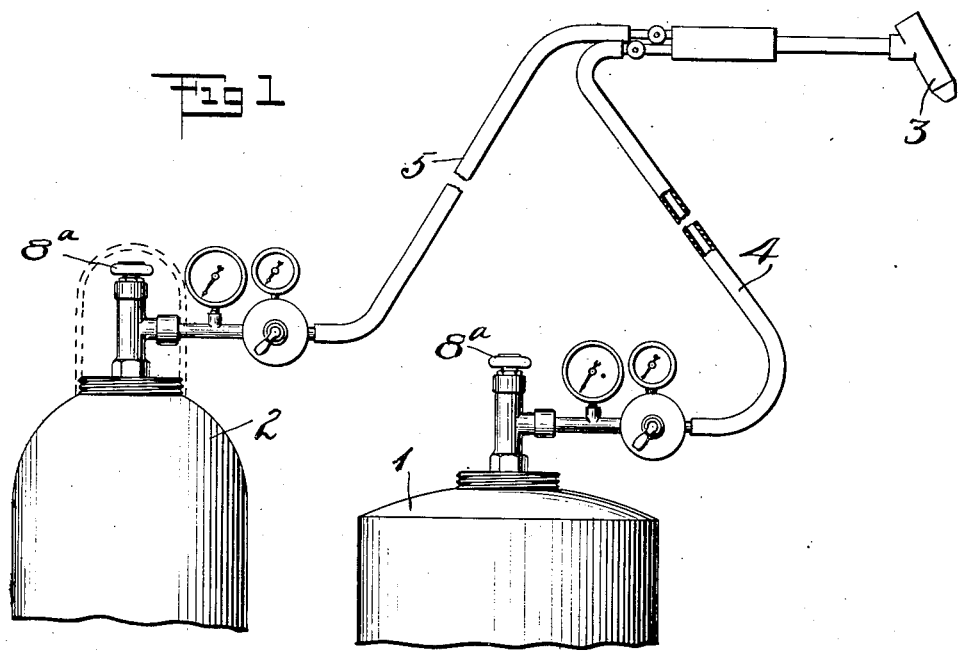
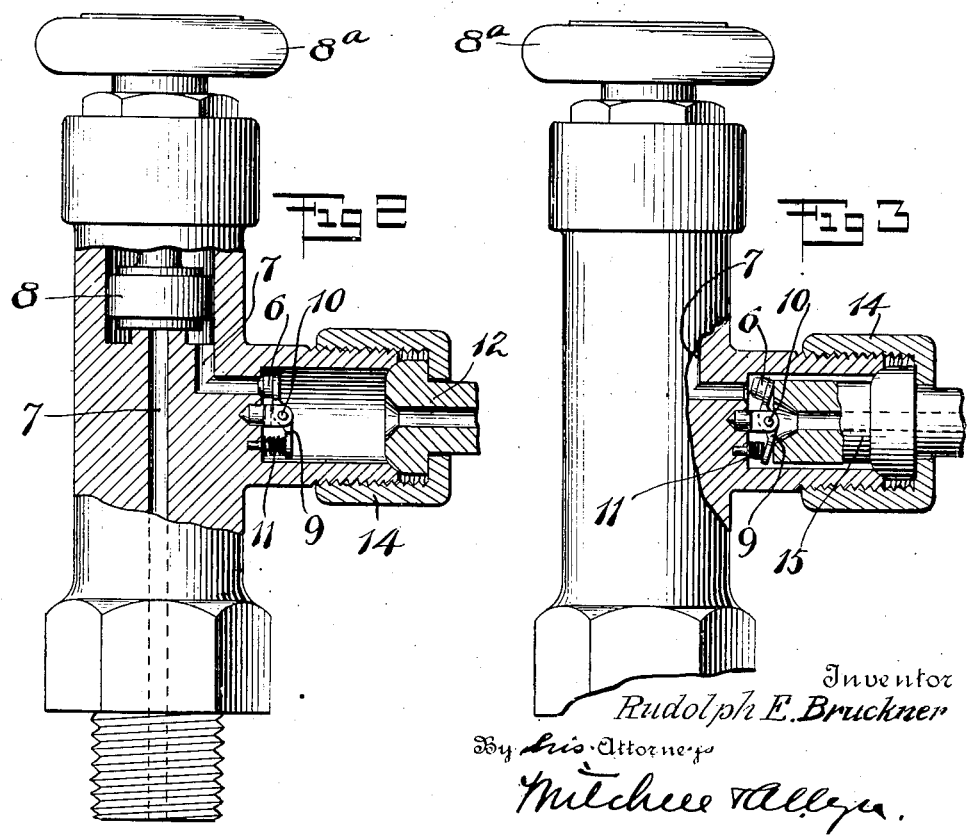
Inventor
Rudolph E. Bruckner
By his Attorneys
Mitchell & Allen

UNITED STATES PATENT OFFICE.

RUDOLPH E. BRUCKNER, OF NEW YORK, N. Y.

SAFETY APPARATUS FOR GAS-TANKS.

1,234,726.  Specification of Letters Patent.  Patented July 31, 1917.

Application filed February 15, 1917. Serial No. 148,731.

*To all whom it may concern:*

Be it known that I, RUDOLPH E. BRUCKNER, a citizen of the United States of America, residing at New York, county and State of New York, have invented a new and useful Safety Apparatus for Gas-Tanks, of which the following is a specification.

My invention relates to safety apparatus for gas tanks. In the present use of gas for cutting and welding torches, it is common to employ two tanks containing different gases which, when mixed, produce an intense flame. The commoner gases now in use include one tank of acetylene. It has been found upon the examination of these tanks that said tanks in some instances contain more or less of the other gas employed, which would indicate that the other gas in service has in some manner been forced back into the acetylene tank. This creates an extremely dangerous condition. My invention aims at eliminating this danger. I have discovered that to do this in the most effective way, the safety apparatus should be associated with the tank itself so that irrespective of the character of service, or the apparatus employed, the tank itself will be safeguarded.

In the accompanying drawings:

Figure 1 is a diagrammatic view of two gas tanks connected up with a cutting or welding torch, as in service.

Fig. 2 is a relatively enlarged view, mainly in section of the valve used with the tank and connected up with a service pipe.

Fig. 3 is a view of the same valve connected up with a charging pipe.

1—2 represent gas tanks designed to contain different gases which are to be conveyed to a torch 3 through pipes 4—5 respectively. Suitable pressure reducing valves and gages may be employed whereby the mixture of gas in the torch may be adjusted and controlled. These gases meet and mingle at some common point in the torch and to prevent the possibility of the gas from either of the tanks from flowing into the other tank in the event, for example, of a stoppage at the tip of the torch, I have provided a safety means which, in one preferred form, I have shown in detail in the drawings. Referring to Figs. 2 and 3, 6 represents a check valve adapted to close the outlet passage 7 against the back flow of gas under normal service conditions. 8 is the shut off valve operated by the handle 8ª by which this passage is opened or closed at will. The check valve 6 in this particular instance is mounted upon rocking member 9 pivoted at 10 and pressed by a spring 11 into the closing position. 12 represents the detachable end of a service pipe which is usually provided with a ground joint to fit gas-tight into the outlet end or nipple of the stud valve, to which said end 12 may be connected by means of a coupling 14. Now assuming the parts are arranged as in Fig. 2. Upon opening the valve 8, gas from the tank will flow through the passage 7 and pass the valves 8 and 6 into and through the service pipe. Any tendency of the gas to flow back through the passage 7 or for any foreign gas to be forced into the passage 7 and the tank connected therewith will be prevented by the check valve 6. Obviously means must be provided to permit the tank to be charged. Ordinarily the charging hose, the nozzle end of which is represented at 15, Fig. 3, is connected to the same nipple to which the service pipe 12 is attached, and it is equally obvious that unless some special means is provided for unseating the check valve 6, the tank could not be charged. To that end I provide, in one form, the nozzle of the charging pipe 15 with an extension beyond the ground joint which is arranged to engage the rocking member 9 when the charging hose is applied so as to unseat the check valve 6, and hold it open during the charging operation. This is shown in Fig. 3. In this form of the apparatus the end of the charging pipe is cut away at the center so as to form a ring-like or relatively narrow annular flange which will suitably clear the standard upon which the rocking member 9 is pivoted and yet will engage the rear end of the rocking member so as to tilt it to hold the check valve 6 open. This will always occur whenever the charging hose is applied. While various means may be employed for unseating the check valve during the charging operation, the particular means shown is preferable because it prevents the charging of the tank by any unauthorized person or concern, since in this case the charging nozzle must be designed to coöperate with the valve so that by the mere application of said charging nozzle the valve will be unseated for charging purposes. Any person or concern authorized to charge the tanks would be provided with a charging nozzle suitable for coöperation with the tank valves, whereas the ordinary charging nozzle would be entirely unfit for such purposes unless reconstructed to embody this invention. While I have shown the check valve and the means for operating the same in one preferred form, it is obvious that each may be modified in a great variety of ways, my aim being to provide the tank valve itself with means to permit the proper flow of gas for service and to likewise prevent the back flow of gas into the tank during service, said means being also capable of such operation as will permit the charging of the tank. Since at the present time there are many tanks in actual service equipped with stud valves, socalled, which are designed substantially as shown in the accompanying drawing, it is desirable to provide a check valve means which may be used effectively with such valves as are already in use without radical change.

It is also desirable to so construct the parts that the ordinary user cannot inadvertently in opening or closing the gas passage disarrange the check valve so that it will not function properly.

I claim:

1. In a safety apparatus for valves for gas tanks, a valve body having a passage, a manually controllable valve therefor, a back check valve therefor for normally preventing the return flow of gas through said passage when said manually controllable valve is opened, said check valve being adapted to be opened to allow recharging of the tank.

2. In a safety apparatus for valves for gas tanks, a valve body having a passage therethrough, a manually controllable valve for said passage, a back check valve for normally preventing the return flow of gas through said passage, and means for unseating said check valve to permit charging, including a charging nozzle coöperating with said check valve to unseat the same for said purpose when said charging nozzle is applied.

3. In a safety apparatus for valves for gas tanks, a valve body having a passage therethrough, a manually operable valve for opening and closing said passage, a back check valve for normally preventing the return flow of gas through said passage, and means for operating the first mentioned valve independently of the second mentioned valve, and means for unseating the second mentioned valve, when the first mentioned valve is open, to permit charging.

RUDOLPH E. BRUCKNER.